United States Patent [19]
Richards

[11] Patent Number: 5,988,752
[45] Date of Patent: Nov. 23, 1999

[54] CHILD'S HEAD SUPPORT

[76] Inventor: Jane Richards, Dell Cottage, Convent Lane, Cobham, Surrey KT11 1EY, United Kingdom

[21] Appl. No.: 08/854,753

[22] Filed: May 12, 1997

Related U.S. Application Data

[63] Continuation of application No. 08/623,053, Mar. 28, 1996, abandoned, which is a continuation of application No. 08/392,447, Feb. 22, 1995, abandoned.

[51] Int. Cl.$^6$ .................................................. A47C 1/10
[52] U.S. Cl. .............. 297/393; 297/219.12; 297/188.01; 297/181
[58] Field of Search ............................ D6/358, 359, 388; 5/907, 419, 655; 297/391, 397, 393, 181, 188.01, 188.2, 219.12, 220, 188.07, DIG. 6, 452.34, 452.35

[56] References Cited

U.S. PATENT DOCUMENTS

| | | | |
|---|---|---|---|
| D. 23,425 | 7/1894 | Ostlund .............................. D6/359 X |
| D. 227,423 | 6/1973 | Ando ..................................... D6/359 |
| D. 229,798 | 1/1974 | Howard ................................. D6/359 |
| D. 294,099 | 2/1988 | Bromberg et al. .................. 297/181 X |
| D. 347,756 | 6/1994 | Robertson ............................ D6/359 |
| 3,082,437 | 3/1963 | Upthagrove ................................ 5/419 |
| 3,840,916 | 10/1974 | Jennings ............................ 297/181 X |
| 4,383,713 | 5/1983 | Roston ................................ 5/655 X |
| 4,434,513 | 3/1984 | Welch ................................. 5/655 X |
| 4,440,443 | 4/1984 | Nordskog . |
| 4,538,310 | 9/1985 | Scott ..................................... 5/655 |
| 4,695,092 | 9/1987 | Hittie ................................ 297/181 X |
| 4,754,512 | 7/1988 | Chao-Yang ......................... 5/419 X |
| 4,776,049 | 10/1988 | Perron ............................... 297/393 X |
| 4,790,042 | 12/1988 | Reich ..................................... 5/655 |
| 4,800,600 | 1/1989 | Baum ................................. D6/388 X |
| 4,984,849 | 1/1991 | Rist ................................ 297/219.12 X |
| 5,093,947 | 3/1992 | Henegar et al. .................... 5/419 X |
| 5,112,104 | 5/1992 | De Giacomi ..................... 297/181 X |
| 5,127,120 | 7/1992 | Mason ................................... 5/655 |
| 5,137,335 | 8/1992 | Marten ............................. 297/181 X |
| 5,147,109 | 9/1992 | Jolly ................................ 297/181 X |
| 5,248,182 | 9/1993 | Hittie ............................... 297/397 X |
| 5,339,472 | 8/1994 | Yin ................................... 5/655 X |
| 5,354,118 | 10/1994 | Barry ................................. 297/181 |
| 5,486,037 | 1/1996 | Harper ............................... 297/397 |

FOREIGN PATENT DOCUMENTS

| | | | |
|---|---|---|---|
| 2342188 | 2/1977 | France ............................... 297/181 |
| 758091 | 9/1956 | United Kingdom ................ 297/393 |
| 2215198 | 9/1989 | United Kingdom ................ 297/181 |
| 2 227 930 | 8/1990 | United Kingdom . |
| 2 264 438 | 9/1993 | United Kingdom . |

*Primary Examiner*—Milton Nelson, Jr.
*Attorney, Agent, or Firm*—Lowe Hauptman Gopstein Gilman & Berner

[57] ABSTRACT

To overcome the antipathy some children have to car travel, a headrest 20 for a baby seat 10 comprises a backing element in the form of a human or animal shape (e.g. a clown) having a head 21 and a body 22, the head having projecting head parts (hair, ears, horns, or the like). The body may have limbs extending from it which may be bent around the child. Either or both pairs of limbs may have fasteners (e.g. VELCRO™ pads) at 25 to hold them around the child. The headrest may be constructed as a container or bag, closable at 25 by a zipper or by other fasteners such as VELCRO™ pads.

3 Claims, 1 Drawing Sheet

CHILD'S HEAD SUPPORT

This application is a continuation of abandoned application Ser. No. 08/623,053 filed Mar. 28, 1996, which in turn is a continuation of abandoned application Ser. No. 08/392,447 filed Feb. 22, 1995.

BACKGROUND OF THE INVENTION

1. Field of the Invention

The present invention relates to head supports for use with baby seats, particularly though not exclusively car baby seats.

2. Prior Art

A car baby seat generally comprises a shell of rigid plastics material molded into a rough L-shape with its sides curved round to form a partial enclosure. The shell has straps to hold the baby in it, and is usually provided with a layer of padding material over most of its inner surface. The shell also has fittings by means of which it can itself be strapped firmly in position in a car; depending on circumstances, the seat may be fitted facing either forwards or backwards.

Such a baby seat is necessarily made to take babies of a substantial range of weights and ages. (Typical ranges are from birth to 4 years, or from 6 months to 6 years.) The seat gives a reasonably good fit for children at the top end of the range, and is therefore significantly over-sized for children at the lower end of the range. Further, some children under some conditions will be alert and sit up by themselves, while others will under some conditions be sleepy and will tend to slump.

Baby seats normally hold the child in a sitting position which is fairly close to upright. A child which slumps, particularly if it is small for the seat, may be made uncomfortable, mainly because the seat will not provide adequate support for the head, which will tend to sag to the side. This is particularly likely with very young children. It has therefore become known to provide head rests for such baby seats.

In one known baby seat, the head rest is incorporated as part of the seat, and is slidable to allow it to be adjusted to match the size of the child. This head rest comprises a pair of support elements, one on each side of the child's head, projecting forward from the rear of the seat molding.

Most baby seats, however, do not incorporate a built-in head rest. A variety of head rests have therefore become available, for use with such baby seats. Such head rests generally consist of a backing element carrying support means which project forward from it. The backing element is placed against the rear of the seat molding so that the child leans back against it, and may extend down to the base area of the seat molding. This results in the support means (which typically extend in an arc around the sides and top of the child's head) projecting forward around and supporting the child's head.

The support means normally contain resilient foamed plastics material, and the backing element is thin and relatively, rigid. The whole head-rest is normally covered in relatively impervious cloth or similar material, which is normally either uniformly colored or patterned with a printed pattern.

The main object of the present invention is to provide an improved head rest for a baby seat.

SUMMARY OF THE INVENTION

According to its main aspect, the invention provides a headrest for a baby seat comprising a backing element carrying support means which project from it, wherein the backing element is constructed as a human or animal shape having a head and a body and the support means are formed as projecting head parts (hair, ears, horns, or the like). A preferred form consists of a clown, with the support means being formed as a pair of elements which imitate the two bunches of bushy hair at the sides of the head.

Some children may either have an innate antipathy to car travel or acquire such an antipathy, and may exhibit various degrees of reluctance to being put into a car seat. The present headrest has an appreciable psychological effect in combatting such antipathy, since it acts as a welcoming parent substitute. The child can of course be told that the figure will cuddle it and hold it on its lap, but there will often be a significant subconscious psychological effect even in the absence of any overt talking to the child (which may indeed be too young to fully understand such verbal explanation).

Preferably, the support means consist of two elements, one on each side of the head of the backing element.

The body preferably has limbs extending from it which may be bent around the child. Either or both pairs of limbs may be provided with fastening means (eg VELCROT™ hook and loop fastening means) to hold them around the child.

According to another feature of the invention, there is provided a headrest for a baby seat comprising a backing element carrying support elements which project from it, wherein the backing element is constructed as a container or bag. The bag may be closable by a zipper or by other fastening means such as VELCRO™ hook and loop fastening means. The bag may be used to contain an additional cushion, or to contain articles associated with the child such as clothing (eg to hold non-bulky clothes to be worn by the child, such as pajamas, a coat, or a jacket) or spare diapers and the like.

BRIEF DESCRIPTION OF THE DRAWINGS

Two headrests embodying the invention will now be described, by way of example, with reference to the drawings, in which.

DESCRIPTION OF PREFERRED EMBODIMENTS

Figure 1:
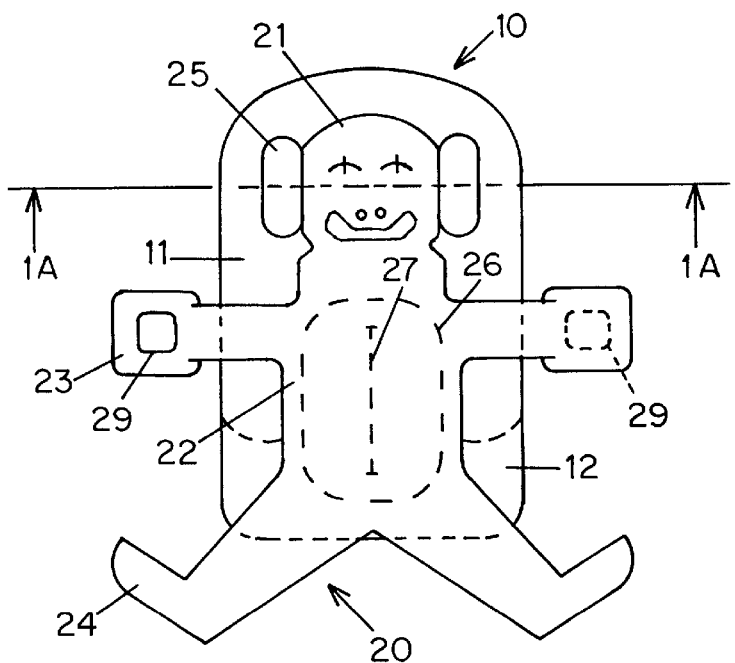
FIG. 1 shows a seat with the first headrest.

Referring to FIG. 1, a baby seat 10 consists of a molding of plastics material. The seat has an upper vertical portion 11 which passes smoothly into a lower forwardly projecting portion 12, and has its edges generally turned inwards all round. In use, the seat is attached to the car by means of straps (not shown), and the child sits on the lower portion 12 with its back against the upper portion 11.

A headrest 20 in the form of a clown is placed in the seat 10. The clown consists of a head 21, a body 22, and arms and legs 23 and 24.

The head 21 and body 22 are constructed as a unit which is sufficiently stiff and self-supporting to hold the head in position, but should be soft enough to avoid discomfort to its occupant. (The body is shown stretched out flat.) The body is preferably also soft enough to allow it to be bent into shape to fit a variety of seats of different brands and slightly different shapes. The head and body may of course include padding, though they should be thin enough to avoid displacing the child significantly from the intended position in the seat 10. The arms and legs 23 and 24 may be made of the same thickness as the body, but may be relatively easily flexible. The various components of the head and body are patterned and colored to represent a clown.

The arms may have fastening means 29 provided at their ends so that they can be fastened together around the child. The hands may incorporate squeakers, and/or may have small toys attached to them.

Figure 1A:
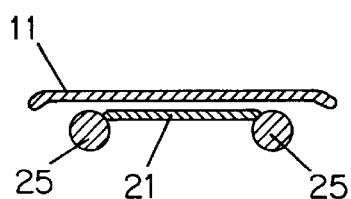
FIG. 1A shows a section through the headrest of FIG. 1 along the line 1A—1A.

The head 21 has a pair of support elements 25 attached to and projecting forward from its sides. These support elements are patterned and colored (e.g. orange) to represent the conventional bushy hair which clowns traditionally have at the sides of their heads. They may conveniently be generally cylindrical (with the axis of the cylinder vertical as seen in the drawing), as shown in FIG. 1A.

The headrest may also have a pocket 26 formed in its body 22, with an access slot 27 in the rear side of the body which may be provided with a zipper or other convenient fastening means. The pocket may be used by the parent to contain eg a diaper changing kit, or by the child to contain eg pajamas or some other articles associated with the journey. Obviously, the pocket would not be used to contain large, hard, or lumpy articles while the headrest is in use in the seat 10. Alternatively or additionally, the headrest may be made to open out, e.g. from the back, to form a changing mat on which the child can be placed for changing its diaper.

Figure 2:
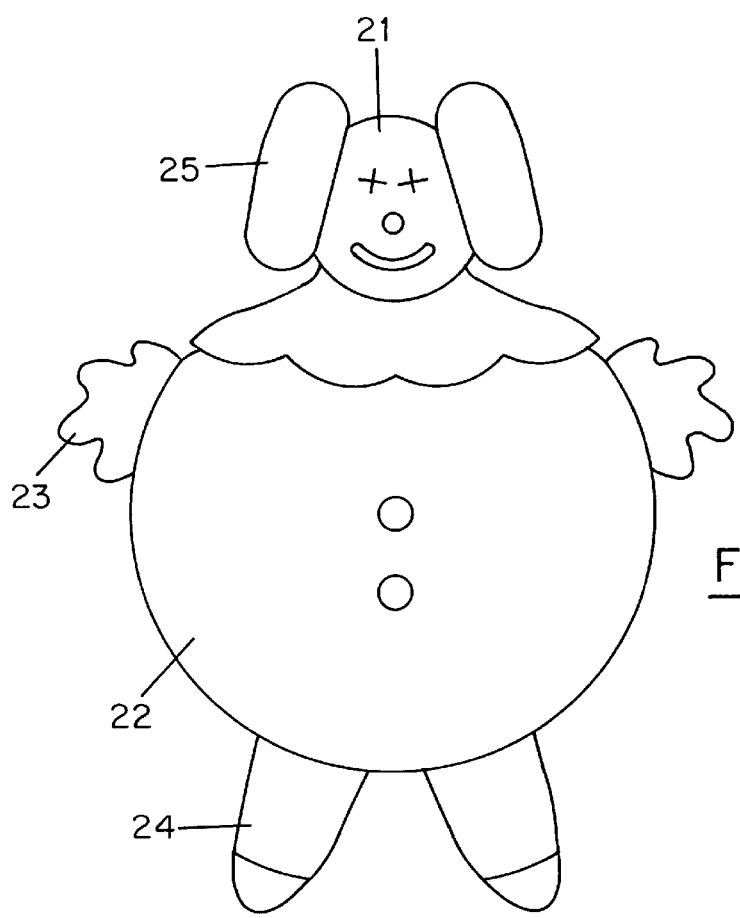
FIG. 2 shows the second headrest.

FIG. 2 shows an alternative shape for the headrest, in which the body is enlarged to a substantially circular shape and the limbs have become reduced to hands and feet alone, with no arms and legs intervening between the hands and feet and the body.

I claim:

1. A child support structure for placement into a child seat to provide additional support for the sides of the head of a small child using the seat, the child support structure comprising:

a backing element having substantially planar front and back faces for placement in the seat, constructed as at least one of a human and an animal shape having a head and a body, the backing element being sufficiently stiff and self-supporting to maintain placement of the backing element in the seat and hold the head of the backing element in position and soft enough to (a) avoid discomfort to the child and (b) to be bent into shape to fit seats of different shapes; and a pair of lateral head support elements disposed on and projecting forwardly from the backing element and being located on opposite sides of where the child's head is adapted to be located, the pair of lateral head support elements being sufficiently stiff to prevent side-to-side movement of the child's head, the pair of lateral head support elements forming projecting head parts from the head of the shape, the backing element including at least one pair of limbs extending therefrom which may be bent around the child, the at least one pair of limbs including a fastener arrangement for holding the limbs around the child, the backing element back planar face including an access slot forming a pocket for receiving implements for care of the child, and a fastener for said slot.

2. A child support structure according to claim 1, wherein the projecting head parts comprise at least one of hair, ears, and horns.

3. A child support structure according to claim 1, wherein the shape of the backing element is a clown, and wherein the projecting head parts imitate two bunches of bushy hair at the sides of the head of the clown.

\* \* \* \* \*